United States Patent
Matozaki et al.

(10) Patent No.: US 7,800,985 B2
(45) Date of Patent: Sep. 21, 2010

(54) OPTICAL PICKUP DEVICE

(75) Inventors: Toshiya Matozaki, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 607 days.

(21) Appl. No.: 11/885,164

(22) PCT Filed: Jan. 30, 2006

(86) PCT No.: PCT/JP2006/301429

§ 371 (c)(1),
(2), (4) Date: Aug. 27, 2007

(87) PCT Pub. No.: WO2006/117906

PCT Pub. Date: Nov. 9, 2006

(65) Prior Publication Data

US 2008/0165662 A1    Jul. 10, 2008

(30) Foreign Application Priority Data

Apr. 27, 2005  (JP) .............................. 2005-128898

(51) Int. Cl.
*G11B 7/09*  (2006.01)

(52) U.S. Cl. .............................. 369/44.16; 369/112.24; 720/682; 720/683

(58) Field of Classification Search ........................ None
See application file for complete search history.

(56) References Cited

U.S. PATENT DOCUMENTS

| 2003/0021219 A1 | 1/2003 | Nagai |
| 2005/0122854 A1 | 6/2005 | Kanou et al. |
| 2006/0013109 A1* | 1/2006 | Fujiwara et al. ........ 369/112.01 |
| 2006/0062098 A1* | 3/2006 | Miyake et al. ........... 369/44.11 |

FOREIGN PATENT DOCUMENTS

| JP | 7-037264 A | 2/1995 |
| JP | 7-210882 A | 8/1995 |
| JP | 10-334487 A | 12/1998 |
| JP | 2002-352449 A | 12/2002 |
| JP | 2003-045067 A | 2/2003 |
| JP | 2003-338069 A | 11/2003 |
| JP | 2004-101587 A | 4/2004 |
| JP | 2004-103087 A | 4/2004 |
| JP | 2005-251352 A | 9/2005 |

* cited by examiner

*Primary Examiner*—Joseph H Feild
*Assistant Examiner*—Tawfik Goma
(74) *Attorney, Agent, or Firm*—Birch, Stewart, Kolasch & Birch, LLP (57) ABSTRACT

An optical pickup device includes an objective lens (1) for focusing a light flux onto an information layer of a disk-shaped medium, an objective lens driving unit that drives the objective lens (1) in a focus servo direction and in a tracking servo direction, a correction lens (14) disposed on the same optical axis as the objective lens (1), and a correction lens driving unit that drives the correction lens (14) in the same direction as the focus servo direction to control the condition of the light flux incident on the objective lens.

19 Claims, 6 Drawing Sheets

OPTICAL PICKUP DEVICE

TECHNICAL FIELD

This invention relates to an optical pickup device for performing recording or reproducing (or both) of information on an information recording medium. In particular, this invention relates to an optical pickup device having a function to correct an optical wave aberration.

BACKGROUND ART

An optical pickup device is configured to focus a light beam on an information layer of an optical disk using an objective lens. The information layer of the optical disk is covered by a transparent cover layer, and it is known that a wave aberration (spherical aberration) occurs if there is a variation in thickness of the cover layer. In order to correct the wave aberration, it is proposed to move a collimator lens to correct the divergence/convergence angle of the light flux incident on the objective lens (see Patent Document No. 1). Further, it is also proposed to move a relay lens to correct the divergence/convergence angle of the light flux incident on the objective lens (see Patent Document No. 2).

Patent Document No. 1: Japanese Laid-Open Patent Publication No. 2004-103087 (Pages 5-6, FIG. 1).

Patent Document No. 2: Japanese Laid-Open Patent Publication No. 2003-338069 (Page 5, FIGS. 1-5).

DISCLOSURE OF THE INVENTION

Problems to be Solved by the Invention

However, in the optical pickup device having such correcting means, it is necessary to provide a driving portion for moving the collimator lens or the relay lens, in addition to a driving portion for moving the objective lens (for example, a magnetic circuit for generating an electromagnetic force). Therefore, the number of components increases, and it becomes difficult to reduce the size of the optical pickup device. Accordingly, it is demanded to reduce the size of the optical pickup device, while correcting the wave aberration.

Further, it is also demanded to move a correction lens at a higher speed, to enable maintaining the position and attitude of the correction lens when not energized, and to prevent fluctuations of the position and attitude of the lens portion due to vibration.

The present invention is intended to solve the above described problems, and an object of the present invention is to enable miniaturization of an optical pickup device. Further, an object of the present invention is to enable moving a correction lens at a faster speed, to enable maintaining the position and attitude of the correction lens when not energized, and to prevent fluctuations of the position and attitude of the correction lens due to vibration.

Means of Solving the Problems

An optical pickup device according to the present invention includes an objective lens for focusing a light flux on an information layer of a disk-shaped medium, an objective lens driving unit that drives the objective lens in a focus servo direction and in a tracking servo direction, a correction lens disposed on the same optical axis as the objective lens, and a correction lens driving unit that drives the correction lens in the same direction as the focus servo direction to control a state of the light flux incident on the objective lens.

EFFECT OF THE INVENTION

According to the present invention, since the correction lens is driven in the same direction as the focus servo direction, it becomes possible to commonly use a magnetic circuit to generate electromagnetic forces for driving the correction lens and for driving the objective lens. As a result, the number of components is reduced, and the optical pickup device can be miniaturized.

Additionally, the friction of a correction lens holder can be controlled by generating the driving force in the same direction as the tracking servo direction. When the correction lens to be moved, it is possible to reduce the friction so as to increase the moving speed. Further, when not energized, it is possible to increase the friction, to thereby maintain the position and attitude of the correction lens, and to prevent fluctuations of the position and attitude of the correction lens due to vibration.

DESCRIPTION OF REFERENCE MARKS

1 . . . objective lens, 2 . . . objective lens holder, 3, 6 . . . magnet, 4 . . . wire, 5 . . . arm, 7 . . . wire holder, 8a-8d . . . yoke, 9 . . . flexible print circuit board, 10 . . . optical sensor, 11 . . . base, 12a, 12b . . . focus servo driving coil, 13a, 13b . . . vertical driving coil, 14 . . . collimator lens, 15 . . . correction lens holder, 16a, 16b . . . tracking servo driving coil, 17a, 17b . . . horizontal driving coil, 18a, 18b . . . magnetic piece, 19a, 19b . . . shaft, 20 . . . wire, 21 . . . plate spring, 22 . . . partition plate, 23 . . . optical disk, 24 . . . cover layer, 26 . . . mirror, 27 . . . prism, 28 . . . semiconductor laser, 29 . . . diffractive grating, 30 . . . focusing lens, 31 . . . sensor lens, 33 . . . light detector, 34 . . . convex lens, 35 . . . concave lens.

BEST MODE FOR CARRYING OUT THE INVENTION

Embodiment 1

Figure 1:
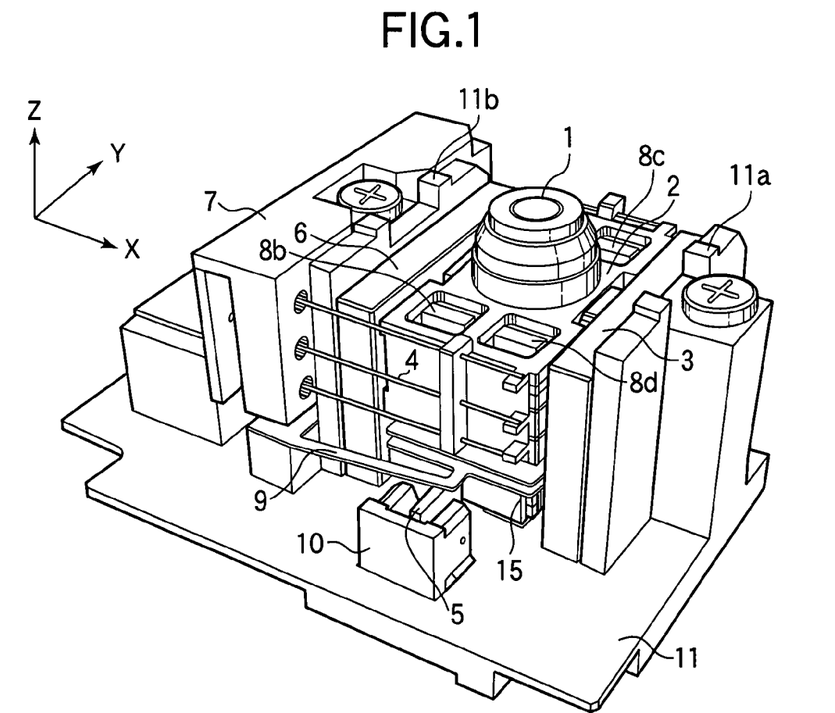
FIG. 1 is a perspective view showing a main part of an optical pickup device according to Embodiment 1 of the present invention.

FIG. 1 is a perspective view showing a main part of an optical pickup device according to Embodiment 1 of the present invention, i.e., an actuator unit for driving an objective lens and a collimator lens.

Figure 8:
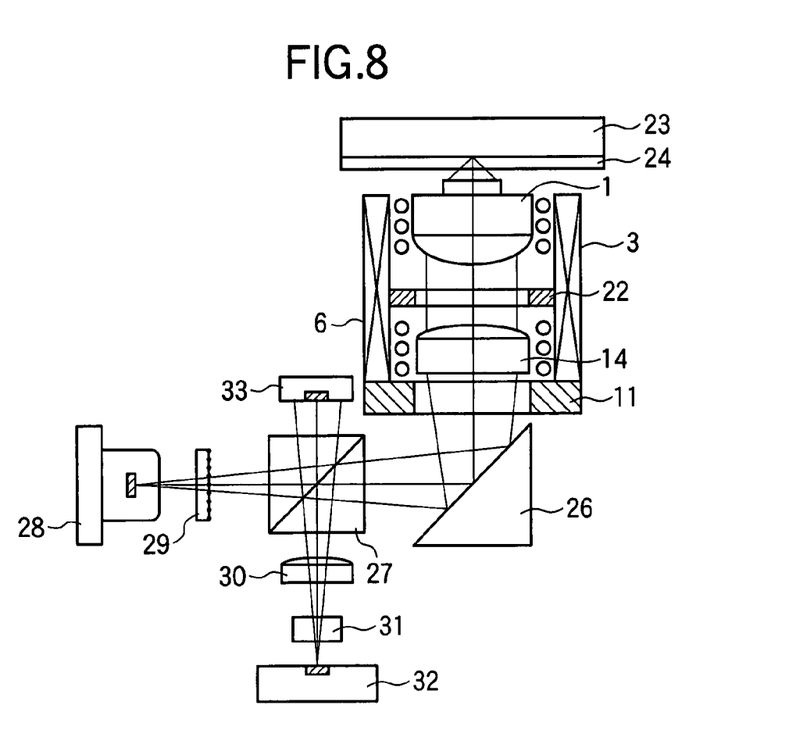
FIG. 8 is a view showing an optical system of an optical pickup device according to Embodiments 1, 2 and 3 of the present invention.

The actuator unit includes a plate-shaped base 11 composed of a magnetic material. Here, the base 11 is placed (horizontally) parallel to an information layer of an optical disk (FIG. 8). The direction perpendicular to the surface of the base 11, i.e., the direction perpendicular to the information layer (the recording surface) of the optical disk is referred to as Z-direction. X-direction and Y-direction are defined in a plane perpendicular to the Z-direction. The X-direction is parallel to a tangential line of a track of the optical disk passing through a center of an objective lens (described later). The Y-direction is a direction traversing a track of the optical disk passing through the center of the objective lens.

A pair of magnets 3 and 6 are provided on the upper surface (i.e., a surface on the optical disk side) of the base 11, and face each other in the X-direction. The magnets 3 and 6 are rectangular plate members composed of neodymium magnet, and are magnetized in the direction of the thickness (the X-direction). The magnets 3 and 6 are so configured that magnetizing directions are opposite to each other on both sides of pole-boundaries 3a and 3b (FIG. 6) defined at the centers of the magnets 3 and 6 in the Y-direction. The magnets 3 and 6 face each other so that the N-pole faces face each other and S-pole faces face each other. A magnetic field is generated in the vicinity of the opposing pole faces of the magnets 3 and 6. The outer surfaces of the respective magnets 3 and 6 are fixed to holding plates 11a and 11b planted on the upper surface of the base 11.

In a region between the magnets 3 and 6, yokes 8a, 8b, 8c and 8d in the form of four columnar members protrude in the Z-direction from the upper surface of the base 11. The yokes 8c and 8d disposed in the vicinity of the magnet 3 and the yokes 8a and 8b disposed in the vicinity of the magnet 6 respectively face each other. The yokes 8a and 8c are disposed on one side (upper right side in the figure) with respect to the magnets 3 and 6 in the Y-direction, and the yokes 8b and 8d are disposed on the other side (lower left side in the figure) with respect to the magnets 3 and 6. In this regard, the yoke 8a (FIG. 3) is in a hidden position in FIG. 1.

The magnets 3 and 6, the yokes 8a through 8d and the base 11 constitute a magnetic circuit. A strong magnetic field is generated in the gap between the magnet 3 and the yokes 8c and 8d, and in the gap between the magnet 6 and the yokes 8a and 8b.

An objective lens holder 2 for mounting the objective lens 1 is disposed between the magnets 3 and 6. The objective lens holder 2 supports the objective lens 1 so that the optical axis of the objective lens 1 is parallel to the Z-direction. The objective lens holder 2 has a shape allowing the yokes 8a through 8d to penetrate in the Z-direction. The objective lens holder 2 is supported by six wires 4 extending approximately in the X-direction. The wires 4 are composed of spring material having electric conductivity such as phosphor-bronze or the like. The wires 4 also function as electricity supplying means for the focus servo driving coils and the tracking servo driving coils.

Six wires 4 are disposed on two portions symmetric to each other with respect to a line of the X-direction passing through the center (i.e., an optical axis) of the objective lens 1 (i.e., a tangential line of the track of the optical disk) in such a manner that three wires are arranged in the Z-direction on each portion, so as to form a substantially parallelepiped link structure. The six wires 4 are supported by a wire holder 7 provided adjacent to the above described holding plate 11b. To be more specific, ends of the respective wires 4 are fixed by a gel-like resin 7a provided in the wire holder 7. With such a configuration, the objective lens holder 2 is supported with appropriate vibration damping properties (viscosity) and spring coefficient. Therefore, the objective lens holder 2 is able to move swiftly in the focus servo direction and tracking servo direction while keeping constant the attitude and angle of the objective lens 1.

Figure 2:
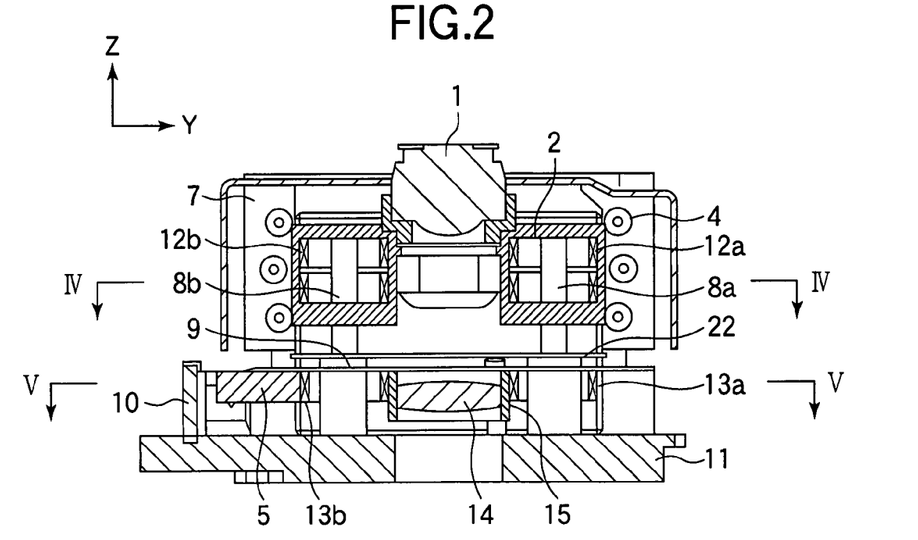
FIG. 2 is a cross sectional view showing the main part of the optical pickup device according to Embodiment 1 of the present invention.
Figure 3:
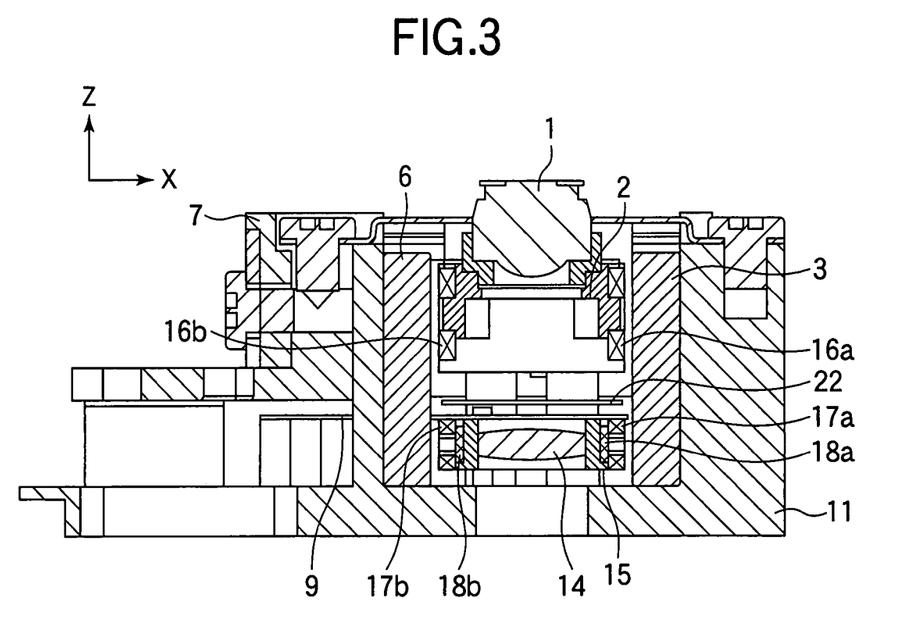
FIG. 3 is a cross sectional view showing the main part of the optical pickup device according to Embodiment 1 of the present invention.
Figure 5:
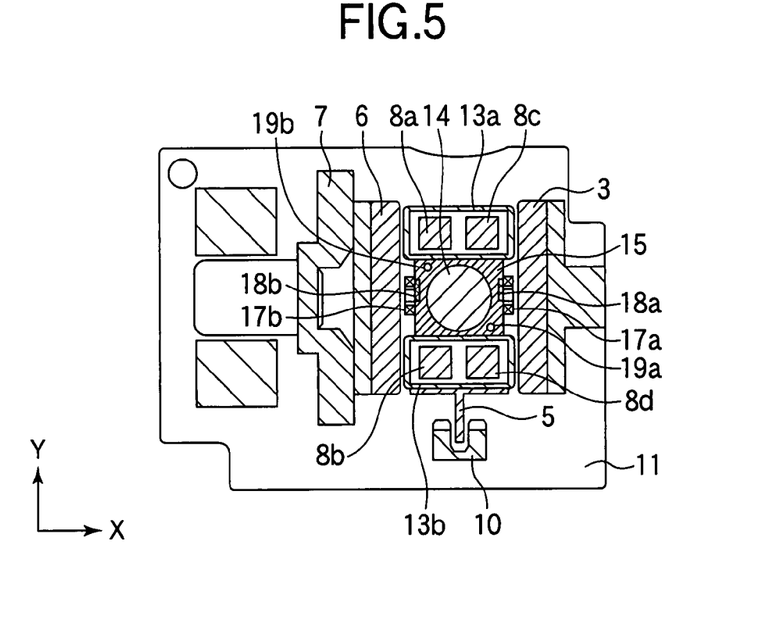
FIG. 5 is a cross sectional view showing the main part of the optical pickup device according to Embodiment 1 of the present invention.

FIG. 2 shows the main part of the optical pickup device shown in FIG. 1, and is a YZ cross sectional view taken along a plane passing through the optical axis of the objective lens 1. FIG. 3 shows the main part of the optical pickup device shown in FIG. 1, and is an XY cross sectional view taken along line IV-IV shown in FIG. 2. FIG. 5 is an XY cross sectional view taken along line V-V shown in FIG. 2.

Focus servo driving coils 12a and 12b (FIG. 2) and tracking servo driving coils 16a and 16b (FIG. 3) are provided on the objective lens holder 2. The objective lens holder 2, the focus servo driving coils 12a and 12b and the tracking servo driving coils 16a and 16b constitute an objective lens moving portion.

Figure 4:
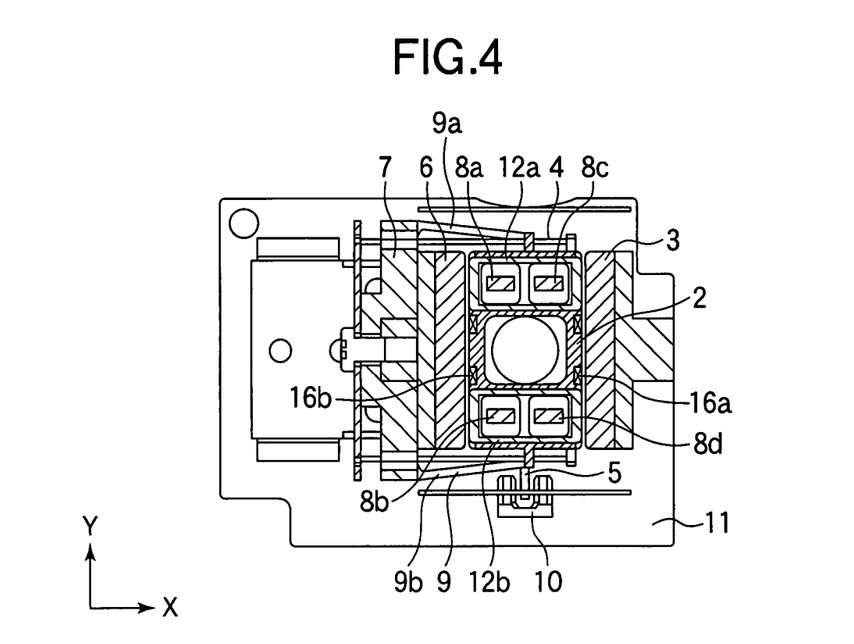
FIG. 4 is a cross sectional view showing the main part of the optical pickup device according to Embodiment 1 of the present invention.

As shown in FIGS. 2 and 4, the focus servo driving coils 12a and 12b are mounted on both sides of the objective lens holder 2 in the Y-direction. The focus servo driving coil 12a includes two sides in the X-direction and two sides in the Y-direction, and is wound surrounding the yokes 8a and 8c. Similarly, the focus servo driving coil 12b includes two sides in the X-direction and two sides in the Y-direction, and is wound surrounding the yokes 8b and 8d. The focus servo driving coils 12a and 12b generate electromagnetic force in the direction (the Z-direction) perpendicular to the surface of the optical disk at coil portions disposed in the gaps between the magnets 3 and 6 and the yokes 8a through 8d.

As shown in FIGS. 3 and 4, the tracking servo driving coils 16a and 16b are provided on the surfaces of the objective lens holder 2 respectively facing the magnets 3 and 6. The tracking servo driving coil 16a is so disposed that two sides (FIG. 4) in the Z-direction respectively face the N-pole face and S-pole face (FIG. 6) of the magnet 3. Similarly, the tracking servo driving coil 16b is so disposed that two sides (FIG. 4) in the Z-direction respectively face the N-pole face and S-pole face (FIG. 6) of the magnet 6. The tracking servo driving coil 16a and 16b generate an electromagnetic force in the Y-direction, i.e., parallel to the direction traversing the track of the optical disk.

The objective lens moving portion (the objective lens holder 2, the focus servo driving coils 12a and 12b and the tracking servo driving coils 16a and 16b) and magnets 3 and 6 constitute an objective lens driving portion (an actuator unit).

As shown in FIGS. 2 and 3, a correction lens moving portion for moving a collimator lens 14 is provided below the objective lens moving portion, with a partition plate 22 disposed therebetween. The correction lens moving portion is configured to share the magnetic circuit (composed of the base 11, the magnets 3 and 6 and the yokes 8a through 8d) with the objective lens moving portion.

The correction lens moving portion includes a correction lens holder 15 holding the collimator lens 14, vertical driving coils 13a and 13b (FIG. 2) and horizontal driving coils 17a and 17b (FIG. 3). The correction lens holder 15 holds the collimator lens 14 so that the optical axis of the collimator lens 14 is aligned on the same optical axis of the objective lens 1. A flexible print circuit board 9 is mounted on the correction lens holder 15 for supplying electricity to the respective coils 13a, 13b, 17a and 17b.

As shown in FIG. 5, the vertical driving coils 13a and 13b are mounted on both sides of the correction lens holder 15 in the Y-direction. The vertical driving coil 13a has two sides in the X-direction and two sides in the Y-direction, and is wound surrounding the yokes 8a and 8c. Similarly, the vertical driving coil 13b has two sides in the X-direction and two sides in the Y-direction, and is wound surrounding the yokes 8b and 8d. The vertical driving coils 13a and 13b generate a driving force in the Z-direction, i.e., in the same direction as the focus servo direction of the objective lens 1 at coil portions disposed in the gaps between the magnets 3 and 6 and the yokes 8a through 8d.

The horizontal driving coils 17a and 17b are mounted on the surfaces of the correction lens holder 15 respectively facing the magnets 3 and 6. The horizontal driving coil 17a is so disposed that two sides in the Z-direction respectively face the N-pole face and the S-pole face (FIG. 6) of the magnet 3. The horizontal driving coil 17b is so disposed that two sides in the Z-direction respectively face the N-pole face and the S-pole face (FIG. 6) of the magnet 6. The horizontal driving coils 17a and 17b generate a driving force in the Y-direction, i.e., the same direction as the tracking servo direction of the objective lens 1.

An arm 5 is mounted on the correction lens holder 15, and extends in the Y-direction. An optical sensor 10 is provided for detecting the position of the arm 5. The optical sensor 10 includes a light emitting portion and a light receiving portion, and outputs electric signal indicating the presence or absence of the arm 5 in between the light emitting portion and the light receiving portion (a detectable area). The electric signal outputted from the optical sensor 10 constitutes a position signal of the collimator lens 14.

The position signal of the collimator lens 1 is used as feedback control signal for the position control of the collimator lens 1 as disclosed in, for example, Japanese Laid-Open Patent Publication No. 2003-338069.

The yokes 8a through 8d are so formed that sections (FIG. 5) within the correction lens holder 15 are larger than sections (FIG. 4) within the objective lens holder 2. Since the correction lens holder 15 does not move in the tracking servo direction, the yoke 8a through 8d do not interfere with the vertical driving coils 13a and 13b even when the yokes 8a through Bd have large sectional areas. By increasing the sectional areas of the yokes 8a through 8d, the gaps between the yokes and the magnets 3 and 6 can be reduced, so that a magnetic field can be strengthened, and therefore electromagnetic conversion efficiency can be enhanced.

The partition plate 22 is composed of a magnetic material, and has a hole allowing the light flux to pass from the collimator lens 14 to the objective lens 1. The partition plate 22 is disposed on step portions of the yokes 8a through 8d (where sectional areas change).

The partition plate 22 forms a loop of magnetic flux (magnetic path) between the yokes 8a through 8d and the magnets 3 and 6, and enhances the efficiency of the magnetic circuit for driving the objective lens 1 and the magnetic circuit for driving the collimator lens 14. As a result, a magnetic field between the yokes 8a through 8d and the magnets 3 and 6 can be strengthened, and electromagnetic conversion efficiency can be enhanced.

The partition plate 22 has a function to shield the magnetic field generated at the respective coils 12a, 12b, 16a and 16b when the objective lens 1 is driven and the magnetic field generated at the respective coils 13a, 13b, 17a and 17b when the collimator lens 14 is driven, to thereby reduce the interaction between the magnetic fields. The partition plate 22 also has a function to prevent the interference (collision) of the objective lens moving portion and the correction lens moving portion.

The above described flexible print circuit board 9 constitutes electricity supplying means for the respective coils 13a, 13b, 17a and 17b. As shown in FIG. 4, the flexible print circuit board 9 has a symmetric shape with respect to a line of the X-direction passing through the center of the objective lens 1 (i.e., a tangential line of the track of the optical disk). The flexible print circuit board 9 is fixed to the wire holder 7 on the base 11 at connecting portions 9a and 9b formed on both ends of the flexible print circuit board 9 in the Y-direction. With such a configuration, the flexible print circuit board 9 supports the correction lens holder 15 with appropriate vibration damping properties and spring resiliency.

As shown in FIG. 5, in the correction lens holder 15, two through-holes extending in the Z-direction are formed on two portions that are symmetric with each other with respect to the center of the collimator lens 14. Shafts 19a and 19b penetrate the through-holes. The bottom ends of the shafts 19a and 19b are fixed to the base 11.

Magnetic pieces 18a and 18b are fixed to the surfaces of the correction lens holder 15 respectively facing the magnets 3 and 6. The magnetic pieces 18a and 18b are disposed on positions respectively shifted from the pole-boundaries 3a and 6a (FIG. 6) of the magnets 3 and 6 in the Y-direction. With such a configuration, the magnetic pieces 18a and 18b generate an urging force against the guide shafts 19a and 19b in the Y-direction.

The correction lens moving portion (the correction lens holder 15, the vertical driving coils 13a and 13b and the horizontal driving coils 17a and 17b) and the magnets 3 and 6 constitute a correction lens driving portion (an actuator unit).

Figure 6:
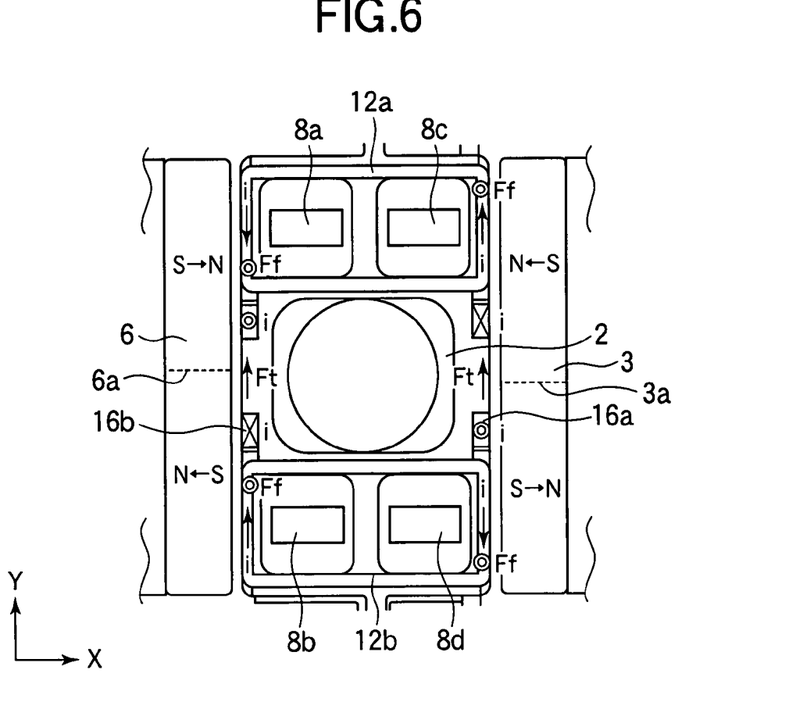
FIG. 6 is a view for illustrating an operation of an objective lens actuator according to Embodiment 1 of the present invention.

FIG. 6 illustrates the operation of the objective lens driving portion of the optical pickup device according to Embodiment 1, and corresponds to a cross sectional view taken along line IV-IV shown in FIG. 2.

As described above, in the vicinity of the pole faces of the magnets 3 and 6, the magnetic field is generated in the X-direction (perpendicular to the respective pole faces). As shown in FIG. 6, when current flows in the focus servo driving coils 12a and 12b in the direction shown in the figure, the electromagnetic force Ff in the direction toward the optical disk (+Z direction) is generated at the focus servo driving coils 12a and 12b due to the interaction with the magnetic field in the vicinity of the magnets 3 and 6 according to Fleming's left-hand rule. In contrast, when the direction of the current flow is reversed, the electromagnetic force Ff in the direction away from the optical disk (−Z direction) is generated at the focus servo driving coils 12a and 12b. By controlling the current i flowing through the focus servo driving coils 12a and 12b, the objective lens 1 can be moved to an arbitrary position in the Z-direction.

Further, when current i flows through the tracking servo driving coils 16a and 16b in the direction shown in the figure, the electromagnetic force Ft in the upward direction in figure (+Y direction) is generated at the tracking servo driving coils

16a and 16b due to the interaction with the magnetic field in the vicinity of the magnets 3 and 6 according to Fleming's left-hand rule. In contrast, when the direction of the current flow is reversed, the electromagnetic force Ft in the downward direction in figure (−Y direction) is generated at the tracking servo driving coils 16a and 16b. By controlling the current i flowing through the tracking servo driving coils 16a and 16b, the objective lens 1 can be moved to an arbitrary position in the Y-direction.

Figure 7:
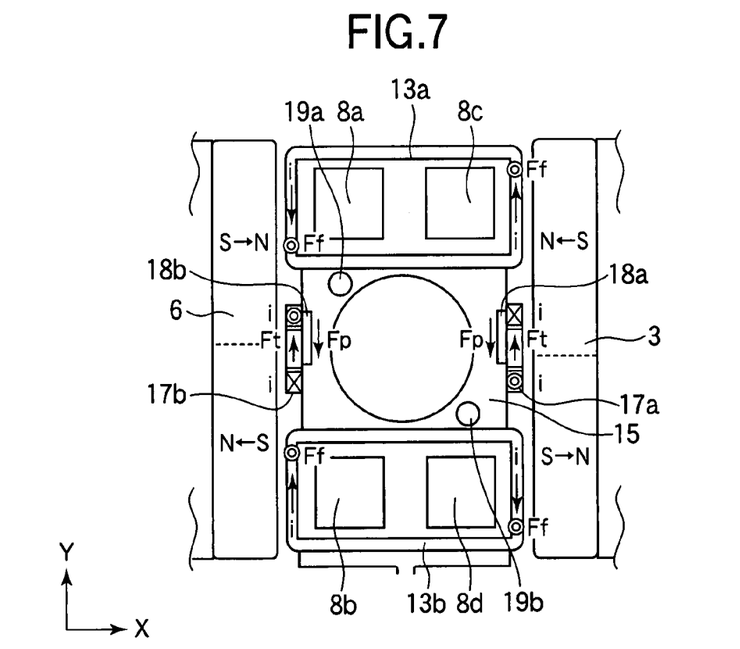
FIG. 7 is a view for illustrating an operation of a collimator lens actuator according to Embodiment 1 of the present invention.

FIG. 7 illustrates the operation of the correction lens driving portion of the optical pickup device according to Embodiment 1, and corresponds to a cross sectional view taken along line V-V shown in FIG. 2.

As shown in FIG. 7, when current i flows through the correction coils 13a and 13b in the direction shown in figure, the electromagnetic force Ff in the direction toward optical the disk (+Z direction) is generated at the vertical driving coils 13a and 13b due to the interaction with the magnetic field in the vicinity of the magnets 3 and 6 according to Fleming's left-hand rule. In contrast, when the direction of the current flow is reversed, the electromagnetic force Ff in the direction away from the optical disk (−Z direction) is generated at the vertical driving coils 13a and 13b. By controlling the current i flowing through the vertical driving coils 13a and 13b, the correction lens 14 can be moved to an arbitrary position in the Z-direction.

The magnetic pieces 18a and 18b provided on the correction lens holder 15 are disposed on positions shifted from the pole-boundaries 3a and 6a of the magnets 3 and 6 in the Y-direction, and therefore the magnetic pieces 18a and 18b are constantly applied with an urging force (biasing force) Fp in the −Y direction. The above described shafts 19 engage the through-holes of the correction lens holder 15, and therefore the correction lens holder 15 is urged against the shafts 19 due to the constant urging force Fp applied to the magnetic pieces 18a and 18b.

In contrast, when current i flows through the horizontal driving coils 17a and 17b in the direction shown in figure, the electromagnetic force Ft in the +Y direction is generated at the horizontal driving coils 17a and 17b due to the interaction with the magnetic field in the vicinity of the magnets 3 and 6 according to Fleming's left-hand rule. The electromagnetic force Ft is opposite to the urging force Fp applied to the magnetic pieces 18a and 18b.

As the current flowing through the horizontal driving coils 17a and 17b gradually increases from 0, the electromagnetic force Ft increases. When the electromagnetic force Ft becomes equal to the force Fp generated by the action of the magnetic pieces 18a and 18b (the directions of the forces are opposite to each other), the force urging the correction lens holder 15 against the shafts 19 becomes 0.

With such a configuration, by controlling the current i of the horizontal driving coils 17a and 17b, it is possible to control the force urging the correction lens holder 15 against the shafts 19a and 19b, to thereby control the friction between the through-holes of the correction lens holder 15 and the shafts 19a and 19b.

In other words, when the collimator lens 14 is to be moved, current i is caused to flow through the horizontal driving coils 17a and 17b so that the static friction force decreases to 0, with the result that the collimator lens 14 can be smoothly moved. In contrast, when the collimator lens 14 is to be fixed, the current i flowing through the horizontal driving coils 17a and 17b is reduced to 0, so as to generate the static friction force utilizing the urging force Fp generated by the action of the magnetic pieces 18a and 18b, with the result that the collimator lens 14 can be kept stationary. In particular, due to the friction force obtained by the urging force Fp, the collimator lens 14 can surely be fixed so that the fluctuations of the position and attitude do not occur even when the vibration is applied.

FIG. 8 is an illustrative view showing an optical system of the optical pickup device according to Embodiment 1. The optical pickup device includes a semiconductor laser 28 that emits light, a diffractive grating 29 on which the light flux (divergent light) emitted by the semiconductor laser 28 is incident, a prism 27 on which the light flux transmitted through the diffractive grating 29 is incident, a power detector 33 that detects the light reflected by the prism 27, and a mirror 26 that reflects the light flux transmitted through the prism 27 to the optical disk 23 side (upward in the figure).

The light flux reflected by the mirror 26 passes through the above described collimator lens 14, and becomes the parallel light flux. The parallel light flux is converged by the objective lens 1, passes through a cover layer 24 of the optical disk 23, and is focused on the information layer (the recording surface).

The optical pickup device further includes a focusing lens 30 and a sensor lens 31 on which the light flux reflected by the information layer of the optical disk 23 (proceeding through the converging light path in the reverse direction, and passing through the prism 27) is incident. The optical pickup device further includes a light detector 32 that receives the light flux transmitted through the focusing lens 30 and the sensor lens 31, and detects servo signal and data signal.

By energizing the above described focus servo driving coils 12a and 12b (FIG. 2) and the tracking servo driving coils 16a and 16b (FIG. 2), the objective lens 1 correctly follows the fluctuation of the information layer of the optical disk 23.

The objective lens 1 is so designed that the converging light flux emitted by the objective lens 1 forms an optimum focusing spot when the light flux has passed through the transparent layer (the cover layer 24) having a predetermined width. Therefore, if the thickness of the cover layer 24 includes an error, the distance along which the light flux passes through the cover layer 24 changes, and a wave aberration (to be more specific, a spherical aberration) occurs on the focusing spot on the information layer of the optical disk 23. In such a case, the diameter of the focusing spot increases, and the recording and reproducing properties are degraded.

However, according to the optical pickup device of this embodiment, by moving the collimator lens 14 (disposed on the incident side of the objective lens 1) in the direction of the optical axis, a spherical aberration that cancels the spherical aberration due to the error of the thickness of the cover layer 24 of the optical disk 23 can be generated. In other words, the spherical aberration due to the error of the thickness of the cover layer 24 can be corrected. The relationship between the aberration due to the error of the thickness of the cover layer 24 and the light flux caused to be incident on the objective lens for correcting the spherical aberration is described in the Japanese Laid-Open Patent Publication No. 2003-338069 (particularly, FIGS. 2 through 4).

In this regard, an optical disk device is constituted by the optical pickup device shown in FIG. 8, a spindle motor that holds and rotates the optical disk 23, and the like.

As described above, according to this embodiment, by moving the collimator lens 14 (the correction lens) disposed coaxially with the objective lens 1 in the direction of the optical axis, it becomes possible to correct the spherical aberration due to the error of the thickness of the cover layer 24.

Further, according to this embodiment, the collimator lens 14 (as the correction lens) is moved in the same direction as the moving direction of the objective lens 1, and therefore the focus servo driving coils 12a and 12b and the vertical driving coils 13a and 13b are configured to generate driving forces in the same direction, with the result that the magnetic circuit (the base 11, the magnets 3 and 6 and the yokes 8a through 8d) can be shared.

In particular, the focus servo driving coils 12a and 12b and the vertical driving coils 13a and 13b use the same pole faces of the magnets 3 and 6 to generate the driving forces, and therefore the magnetic circuit can be shared in a simple configuration.

Further, in this embodiment, the collimator lens 14 as the correction lens is disposed below the objective lens 1 to thereby obtain the optical system in which the entire length of the light path is the shortest, and therefore the optical pickup device can be miniaturized.

Further, in this embodiment, the correction lens holder 15 is biased by means of the magnetic pieces 18a and 18b, and therefore the collimator lens 14 is surely fixed at a desired position even when not energized, and the fluctuation of the position and attitude of the collimator lens 14 can be prevented. In addition, when the collimator lens 14 is to be moved, the friction force applied to the correction lens holder 15 is reduced by energizing the horizontal driving coils 17a and 17b, and therefore the correction lens holder 15 can be moved at a high speed.

Furthermore, since the tracking servo driving coils 16a and 16b and the horizontal driving coils 17a and 17b generate the driving forces in the same directions, it becomes possible to share the magnetic circuit (the base 11, the magnets 3 and 6 and the yokes 8a through 8d).

In particular, since the tracking servo driving coils 16a and 16b and the vertical driving coils 17a and 17b use the same pole faces of the magnets 3 and 6, the sharing of magnetic circuit can be accomplished in a simple configuration.

In addition, since the correction lens holder 15 is guided by the shafts 19a and 19b, the accuracy of the linear movement of the collimator lens 14 is enhanced by means of the sliding contact between the shafts 19a and 19b and the through-holes of the correction lens holder 15.

Further, since the correction lens holder 15 and the objective lens holder 2 are arranged in the direction of the optical axis (the Z-direction), the miniaturization of the optical pickup device can be accomplished.

Furthermore, since the partition plate 22 is disposed between the correction lens holder 15 and the objective lens holder 2, it becomes possible to prevent the interference between the correction lens holder 15 and the objective lens holder 2. Furthermore, the magnetic path for driving the collimator lens 14 and the magnetic path for driving the objective lens 1 can be respectively configured in a small size. With this, the magnetic field between the magnets 3 and 6 and the yokes 8a through 8d can be strengthened, and therefore the electromagnetic conversion efficiency can be enhanced. Further, the magnetic field generated at the respective coils 12a, 12b, 16a and 16b for driving the objective lens 1 and the magnetic field generated at the respective coils 13a, 13b, 17a and 17b for driving the collimator lens 14 are shielded from each other, so that the interaction therebetween can be prevented.

In addition, since the correction lens holder 15 is supported using the flexible print circuit board 9, it becomes possible to support the correction lens holder 15 with certain spring resiliency and vibration damping properties while supplying the electricity to the respective coils 13a, 13b, 17a and 17b. Further, by employing the supporting structure similar to the supporting structure of the objective lens 2 (the supporting structure using the wires 4), it becomes possible to share the magnetic circuit, and to miniaturize the optical pickup device.

Further, since the arm 5 provided on the correction lens holder 15 is detected using the optical sensor 10, it becomes possible to obtain the positional information of the correction lens holder 15 and to control the position of the collimator 14.

Furthermore, since the objective lens holder 2, the magnets 3 and 6, the correction lens holder 15 and the guide shafts 19a and 19b are provided on the common base 10, concentricity and perpendicularity of the respective components can be obtained with a high accuracy, and the optical pickup device can be miniaturized.

Embodiment 2

Figure 9:
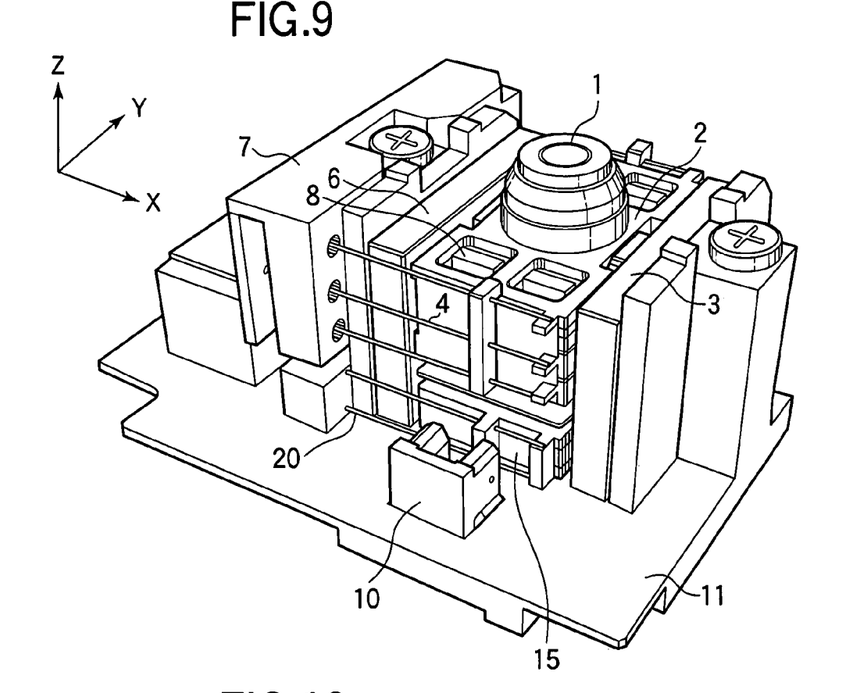
FIG. 9 is a perspective view showing the main part of the optical pickup device according to Embodiment 2 of the present invention.

FIG. 9 is a perspective view showing an actuator unit of an objective lens and a collimator lens in an optical pickup device according to Embodiment 2 of the present invention. This embodiment is different from Embodiment 1 in the structure of the correction lens moving portion (the correction lens holder 15 and the respective coils 13a, 13b, 17a and 17b).

In this embodiment, the correction lens holder 15 is supported using a plurality of (in this example, four) wires 20. The wires 20 are composed of spring members made of phosphor bronze or the like, and also function as electricity supplying means for the respective coils 13a, 13b, 17a and 17b fixed to the correction lens holder 15. Both ends of each wire 20 are fixed to an end of the respective coil and to an electricity supply source.

The respective wires 20 are disposed on two portions symmetric to each other with respect to a line of the X-direction passing through the center (i.e., an optical axis) of the objective lens 1 (i.e., a tangential line of a track of the optical disk) in such a manner that two wires are arranged in the Z-direction on each portion, so as to form a substantially parallelepiped link structure. Although only two wires 20 disposed on the +Y side of the correction lens holder 15 are shown in FIG. 9, two more similar wires 20 are disposed on the −Y side of the correction lens holder 15. The wires 20 extend in the X-direction, and are fixed by a gel-like resin (not shown) provided on the wire holder 7. With such a configuration, the correction lens holder 15 is supported with appropriate vibration damping properties (viscosity) and spring coefficient, and is able to move swiftly.

The configuration of the optical pickup device of this embodiment is the same as the optical pickup device (FIGS. 1 through 8) according to Embodiment 1, except the supporting structure of the correction lens holder 15.

Further, in this embodiment, the objective lens driving portion and the correction lens driving portion share the magnetic circuit composed of the base 11, the magnets 3 and 6 and the yokes 8a through 8d (indicated by numeral 8 in FIG. 9) as is the case with Embodiment 1. Further, the partition plate 22 made of magnetic material is provided between the objective lens holder 2 and the correction lens holder 15.

According to this embodiment, the correction lens holder 15 is supported using the link structure, and therefore the collimator lens 14 can be moved while maintaining a constant attitude of the collimator lens 14. Further, the collimator lens 14 is supported by a primary vibration system having appropriate vibration damping properties and spring resiliency, and therefore the stability of the position control can be enhanced.

Further, the supporting structure of the correction lens holder 15 is similar to the supporting structure of the objective lens 2, and therefore the magnetic circuit is shared by the correction lens driving portion and the objective lens driving portion, with the result that the miniaturization of the device can be accomplished.

Furthermore, the supporting of the correction lens holder 15 and the supply of the electricity to the respective coils 13*a*, 13*b*, 17*a* and 17*b* are performed by the same members, and therefore the number of components can be reduced.

Embodiment 3

Figure 10:
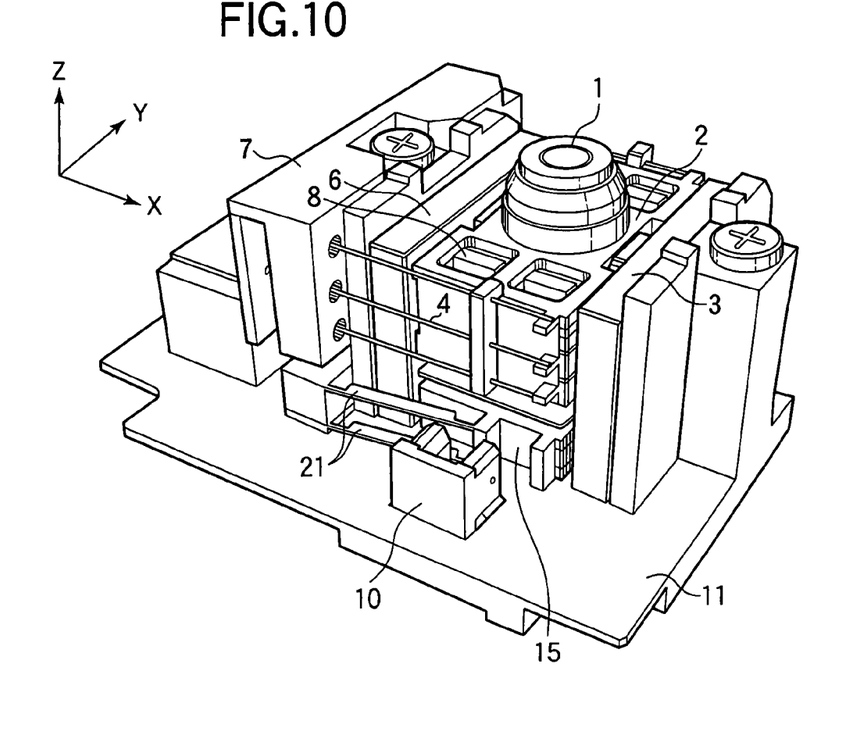
FIG. 10 is a perspective view showing the main part of the optical pickup device according to Embodiment 3 of the present invention.

FIG. 10 is a perspective view showing an actuator unit of an objective lens and a collimator lens in an optical pickup device according to Embodiment 3 of the present invention. This embodiment is different from Embodiment 1 in the structure of the correction lens moving portion (the correction lens holder 15 and the respective coils 13*a*, 13*b*, 17*a* and 17*b*).

In this embodiment, the correction lens moving portion is supported using a plurality of (in this example, four) plate springs 21. The plate springs 21 are composed of spring members made of phosphor bronze or the like, and also function as electricity supplying means for the respective coils 13*a*, 13*b*, 17*a* and 17*b* fixed to the correction lens holder 15. Both ends of each plate spring 21 are fixed to an end of the respective coil and to an electricity supply source.

The plate springs 21 are disposed on two portions symmetric to each other with respect to a line of the X-direction passing through the center (i.e., an optical axis) of the collimator lens 14 (i.e., a tangential line of a track of the optical disk) in such a manner that two springs are arranged in the Z-direction on each portion, so as to form a substantially parallelepiped link structure. Although only two plate springs 21 disposed on the −Y side of the correction lens holder 15 are shown in FIG. 10, two more similar plate springs 21 are disposed on the +Y side of the correction lens holder 15. The plate springs 21 extend in the X-direction, and are fixed by a gel-like resin (not shown) provided on the wire holder 7. With such a configuration, the correction lens holder 15 is supported with appropriate vibration damping properties (viscosity) and spring coefficient, and is able to move swiftly.

The configuration of the optical pickup device of this embodiment is the same as the optical pickup device (FIGS. 1 through 8) according to Embodiment 1, except the supporting structure of the correction lens moving portion.

Further, in this embodiment, the objective lens driving portion and the correction lens driving portion share the magnetic circuit composed of the base 11, the magnets 3 and 6 and the yokes 8*a* through 8*d* (indicated by numeral 8 in FIG. 9) as described in Embodiment 1. Further, the partition plate 22 made of magnetic material is provided between the objective lens holder 2 and the correction lens holder 15.

According to this embodiment, the correction lens holder 15 is supported using the link structure, and therefore the collimator lens 14 can be moved while maintaining a constant attitude of the collimator lens 14. Further, the collimator lens 14 is supported using a primary vibration system having appropriate vibration damping properties and spring resiliency, and therefore the stability of the position control can be enhanced.

Further, the supporting structure of the correction lens holder 15 is similar to the supporting structure of the objective lens 2, and therefore the magnetic circuit is shared by the correction lens driving portion and the objective lens driving portion, with the result that the miniaturization of the device can be accomplished.

Furthermore, the supporting of the correction lens holder 15 and the supply of the electricity to the respective coils 13*a*, 13*b*, 17*a* and 17*b* are performed by the common members, and therefore the number of components can be reduced.

Embodiment 4

Figure 11:
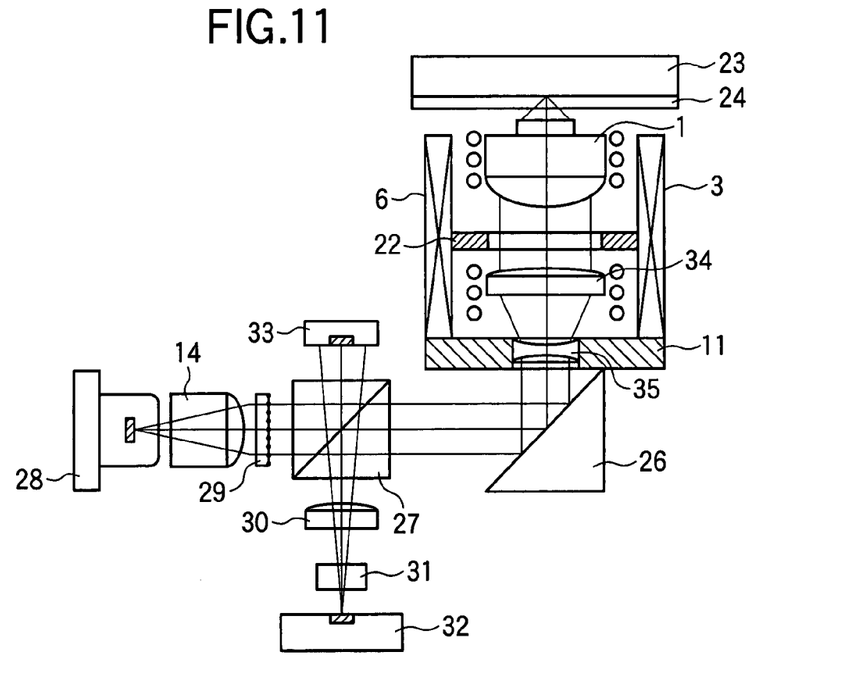
FIG. 11 is an illustrative view showing an optical system of an optical pickup device according to Embodiments 4, 5 and 6 of the present invention.

FIG. 11 is a view showing an optical system of an optical pickup device of Embodiment 4 of the present invention. In this embodiment, a convex lens as a component of a beam expander is used as the correction lens instead of the collimator lens 4 (FIG. 8).

In this embodiment, a beam expander (relay lens) composed of a convex lens 34 and a concave lens 35 is disposed on a light path between the objective lens 1 and the mirror 26, and one of the convex lens 34 and the concave lens 35 (in this example, the convex lens 34) is moved. With such a configuration, the light flux incident on the objective lens 1 is converted slightly into the divergent light flux or the convergent light flux, to thereby change a wave aberration of the beam incident on the optical disk 23 from the objective lens 1. With this, the spherical aberration at the information layer of the optical disk can be cancelled, and therefore the beam spot having less aberration is formed.

The method for correcting the spherical aberration by moving the convex lens of the beam expander is disclosed in, for example, Japanese Laid-Open Patent Publication No. 2004-13087.

As shown in FIG. 11, the convex lens 34 of the beam expander is disposed below the objective lens 1 on the optical axis of the objective lens 1, and is fixed to the correction lens holder 15 (FIGS. 1, 3, 5 and 7) described in Embodiment 1. In contrast, the concave lens 35 of the beam expander is disposed below the convex lens 34, and is fixed inside a hole portion 11*d* formed on the base 11.

The configuration of the optical pickup device of this embodiment is the same as the optical pickup device (FIGS. 1 through 8) according to Embodiment 1, except the convex lens 34 of the beam expander used instead of the collimator lens 14.

To be more specific, the correction lens holder 15 holding the convex lens 34 is resiliently supported by the flexible print circuit board 9 as described in Embodiment 1. The correction lens holder 15 holding the convex lens 34 is driven in the Z-direction by the vertical driving coils 13*a* and 13*b* (FIG. 2), and the friction force between the correction lens holder 15 and the shafts 19 (FIG. 5) is controlled by horizontal driving coils 17*a* and 17*b* (FIG. 3).

Further, in this embodiment, the objective lens driving portion and the correction lens driving portion share the magnetic circuit composed of the base 11, the magnets 3 and 6 and the yokes 8*a* through 8*d* (omitted in FIG. 11) as in Embodiment 1. Further, the partition plate 22 made of magnetic material is provided between the objective lens holder 2 and the correction lens holder 15.

According to this embodiment, by moving the convex lens 34 of the expander lens (disposed coaxially with the objective lens 1) in the axial direction, it is possible to generate a spherical aberration that cancels the spherical aberration due to the error of thickness of the cover layer 24. That is, it is possible to correct the spherical aberration due to the error of thickness of the cover layer 24.

Further, in this embodiment, the convex lens 34 of the beam expander is used as the correction lens, and is disposed below the objective lens 1, and therefore it is possible to obtain the optical system in which the entire length of the light path is the shortest. Therefore, the optical pickup device can be miniaturized.

Furthermore, since the objective lens holder 2, the magnets 3 and 6, the correction lens holder 15 and the guide shafts 19a and 19b are provided on the common base 10, concentricity and perpendicularity of the respective components can be obtained with a high accuracy, and the optical pickup device can be miniaturized.

In particular, since the concave lens 35 of the beam expander is fixed to the base 11, concentricity and perpendicularity between the concave lens 35 and the convex lens 34 can be obtained with a high accuracy.

Embodiment 5

Embodiment 5 is that the correction lens holder 15 is supported by the wires 20 as described in Embodiment 2 in the configuration where the convex lens 34 (FIG. 11) of the beam expander is moved as described in Embodiment 4. The concave lens 35 of the beam expander is fixed to the base 11, as described in Embodiment 4.

The configuration of the optical pickup device according to this embodiment is the same as the optical pickup device described in Embodiment 4, except the supporting structure of the correction lens holder 15.

According to this embodiment, by moving the convex lens 34 of the expander lens (disposed coaxially with the objective lens 1) in the axial direction, it is possible to correct the spherical aberration due to the error of thickness of the cover layer 24. Further, since the correction lens holder 15 is supported using the link structure, the convex lens 34 can be moved while maintaining a constant attitude of the convex lens 34. Further, the convex lens 34 is supported using the vibration primary system having appropriate vibration damping properties and spring resiliency, and therefore the stability of the position control can be enhanced.

Embodiment 6

Embodiment 6 is that the correction lens holder 15 is supported by the plate springs 21 as described in Embodiment 3 in the configuration where the convex lens 34 (FIG. 11) of the beam expander is moved as described in Embodiment 4. The concave lens 35 of the beam expander is fixed to the base 11, as was described in Embodiment 4.

The configuration of the optical pickup device according to this embodiment is the same as the optical pickup device described in Embodiment 4, except the supporting structure of the correction lens holder 15.

According to this embodiment, by moving the convex lens 34 of the expander lens (disposed coaxially with the objective lens 1) in the axial direction, it is possible to correct the spherical aberration due to the error of thickness of the cover layer 24. Further, since the correction lens holder 15 is supported by the link structure, the convex lens 34 can be moved while maintaining a constant attitude of the convex lens 34. Further, the convex lens 34 is supported using the vibration primary system having appropriate vibration damping properties and spring resiliency, and therefore the stability of the position control can be enhanced.

Embodiment 7

Figure 12:
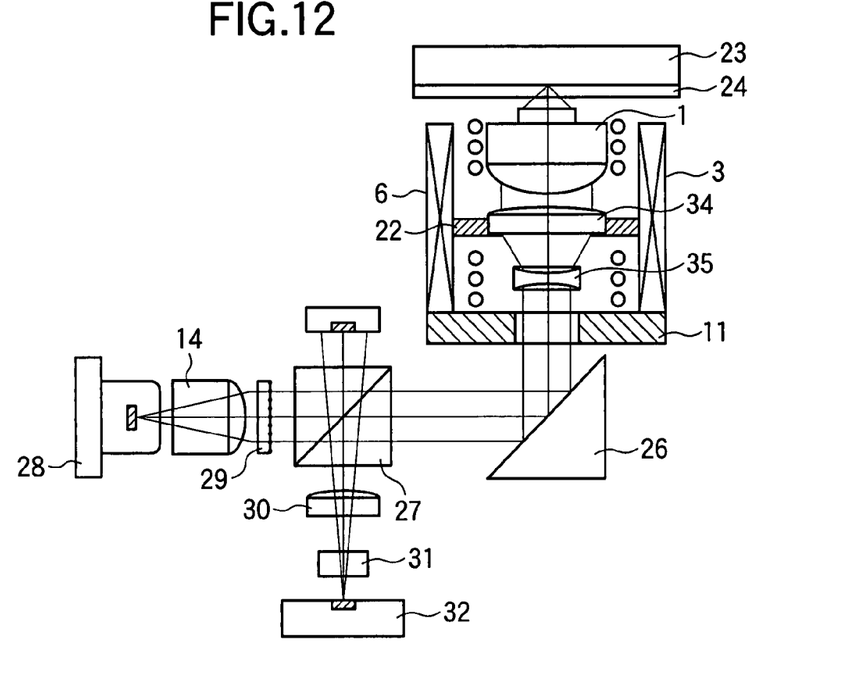
FIG. 12 is a view showing an optical system of an optical pickup device according to Embodiments 7, 8 and 9 of the present invention.

FIG. 12 is a view showing an optical system of an optical pickup device according to Embodiment 7 of the present invention. In this embodiment, the concave lens 35 is used as the correction lens instead of the convex lens 34 as a component of the beam expander.

As shown in FIG. 12, the convex lens 34 of the beam expander is disposed below the objective lens 1 on the optical axis of the objective lens 1, and is fixed inside a hole portion of the partition plate 22. In contrast, the concave lens 35 of the beam expander is disposed on the optical axis of the objective lens 1, and is fixed to the correction lens holder 15 (FIGS. 1, 3, 5 and 7) described in Embodiment 1.

The configuration of the optical pickup device according to this embodiment is the same as the optical pickup device (FIG. 11) according to the above described Embodiment 4, except that the concave lens 35 is driven instead of the convex lens 34 of the beam expander.

That is, the correction lens holder 15 supporting the concave lens 35 is resiliently supported by the flexible print circuit board 9 described in Embodiment 1. Further, the correction lens holder 15 holding the concave lens 35 is driven in the Z-direction by the vertical driving coils 13a and 13b (FIG. 2), and the friction between the correction lens holder 15 and the shafts 19 (FIG. 5) is controlled by the horizontal driving coils 17a and 17b (FIG. 3).

Further, as in Embodiment 1, the objective lens driving portion and the correction lens driving portion are configured to share the magnetic circuit composed of the base 11, the magnets 3 and 6 and the yokes 8a through 8d (omitted in FIG. 12). A partition plate 22 (to which the convex lens 34 is fixed) made of magnetic material is provided between the objective lens holder 2 and the correction lens holder 15.

As described above, according to this embodiment, by moving the concave lens 35 of the beam expander (disposed coaxially with the objective lens 1) in the axial direction, it is possible to generate a spherical aberration that cancels the spherical aberration due to the error of thickness of the cover layer 24. In other words, it is possible to correct the spherical aberration due to the error of thickness of the cover layer 24.

Further, in this embodiment, the concave lens 35 of the beam expander is used as the correction lens, and is disposed below the objective lens 1, and therefore it is possible to obtain the optical system in which the entire length of the light path is the shortest. Therefore, the optical pickup device can be miniaturized.

Furthermore, since the objective lens holder 2, the magnets 3 and 6, the correction lens holder 15 and the guide shafts 19a and 19b are provided on the common base 10, concentricity and perpendicularity of the respective components can be obtained with a high accuracy, and the optical pickup device can be miniaturized.

In particular, since the convex lens 34 of the beam expander is fixed with respect to the base 11, concentricity and perpendicularity between the convex lens 34 and the concave lens 35 can be obtained with a high accuracy.

Embodiment 8

Embodiment 8 is that the correction lens holder 15 is supported by the wires 20 as described in Embodiments 2 and 5 in the configuration where the concave lens 35 (FIG. 12) of the beam expander is moved as described in Embodiment 7. The convex lens 34 of the beam expander is fixed to the base 11, as described in Embodiment 7.

The configuration of the optical pickup device is the same as the optical pickup device described in Embodiment 7, except the supporting structure of the correction lens holder 15.

According to this embodiment, in addition to the advantages obtained by the above described Embodiment 7, the concave lens 35 can be moved while maintaining a constant attitude due to the employment of the link structure, and the stability of the position control can be enhanced.

Embodiment 9

Embodiment 9 is that the correction lens holder 15 is supported by the plate springs 21 as described in Embodiments 3 and 6 in the configuration where the concave lens 35 (FIG. 12) of the beam expander is moved as described in Embodiment 7. The convex lens 34 of the beam expander is fixed to the base 11, as described in Embodiment 7.

The configuration of the optical pickup device is the same as the optical pickup device described in Embodiment 7, except the supporting structure of the correction lens holder 15.

According to this embodiment, in addition to the advantages obtained by the above described Embodiment 7, the concave lens 35 can be moved while maintaining a constant attitude due to the employment of the link structure, and the stability of the position control can be enhanced.

The invention claimed is:

1. An optical pickup device comprising:
an objective lens for focusing a light flux on an information layer of a disk-shaped medium;
an objective lens driving unit that drives said objective lens in a focus servo direction and in a tracking servo direction;
a correction lens disposed on the same optical axis as said objective lens,
a correction lens holder holding said correction lens;
at least one shaft that guides said correction lens holder in the same direction as said focus servo direction, and
a correction lens driving unit that drives said correction lens holder in the same direction as said focus servo direction to control a state of said light flux incident on said objective lens,
wherein said correction lens driving unit includes:
an electromagnetic coil for generating a driving force in said tracking servo direction, and
a magnetic piece and a magnet for generating a biasing force that biases said correction lens holder against said shaft in a direction opposite to said driving force generated by said electromagnetic coil, and
wherein said correction lens driving unit controls current flowing through said electromagnetic coil to thereby control a force with which said correction lens holder is urged against said shaft in such a manner that a friction force between said correction lens holder and said shaft is smaller in the case of driving said correction lens than in the case of keeping said correction lens holder in resting state.

2. The optical pickup device according to claim 1, wherein current is not caused to flow through said electromagnetic coil in the case of keeping said correction lens holder in resting state, and
wherein current is caused to flow through said electromagnetic coil in the case of driving said correction lens holder, so as to generate said driving force resisting said biasing force so that said friction force between said correction lens holder and said shaft is reduced.

3. The optical pickup device according to claim 1, wherein said correction lens is a collimator lens,
wherein said correction lens driving unit drives said collimator lens in the same direction as said focus servo direction to thereby correct a wave aberration generated at said objective lens.

4. The optical pickup device according to claim 1, wherein said correction lens driving unit includes an electromagnetic coil for generating a driving force in the same direction as said focus servo direction.

5. The optical pickup device according to claim 1, wherein said objective lens driving unit includes a magnet having a pole face for generating an electromagnetic force for driving said objective lens in said focus servo direction, and
wherein said correction lens driving unit obtains a driving force by means of the common pole face with said objective lens driving unit.

6. The optical pickup device according to claim 1, wherein said objective lens driving unit includes a magnet having a pole face for generating an electromagnetic force for driving said objective lens in said tracking servo direction, and
wherein said correction lens driving unit obtains a driving force by means of the common pole face with said objective lens driving unit.

7. The optical pickup device according to claim 1, wherein said correction lens holder holding said correction lens and an objective lens holder holding said objective lens are arranged in said focus servo direction.

8. The optical pickup device according to claim 1, wherein at least one electromagnetic coil provided on said correction lens holder and at least one electromagnetic coil provided on said objective lens holder are disposed in a common magnetic circuit.

9. The optical pickup device according to claim 1, further comprising a partition plate disposed between said correction lens holder holding said correction lens and an objective lens holder holding said objective lens,
wherein said partition plate has an opening on a position corresponding to a light path between said correction lens and said objective lens.

10. The optical pickup device according to claim 1, wherein said correction lens driving unit includes a flexible print circuit board that supports said correction lens holder holding said correction lens, and
wherein said flexible print circuit board has a symmetric shape with respect to a normal line of said disk-shaped medium passing through a center of said correction lens.

11. The optical pickup device according to claim 1, wherein said correction lens driving unit includes a plurality of wires that support said correction lens holder holding said correction lens, and a gel-like resin with which said plurality of wires are fixed,
wherein said plurality of wires are arranged in said focus servo direction on at least two portions which are symmetric with respect to a normal line of a track on said disk-shaped medium passing through a center of said correction lens.

12. The optical pickup device according to claim 1, wherein said correction lens driving unit includes a plurality of plate springs that support said correction lens holder holding said correction lens, and a gel-like resin in which said plurality of plate springs are fixed,
wherein said plurality of plate springs are arranged in said focus servo direction on at least two portions which are symmetric with respect to a normal line of a track on said disk-shaped medium passing through a center of said correction lens.

13. The optical pickup device according to claim 1, wherein said correction lens driving unit includes:
an arm provided on said correction lens holder holding said correction lens, and
an optical sensor for detecting said arm.

14. The optical pickup device according to claim 1, wherein an objective lens holder holding said objective lens, a magnet for driving said objective lens in said focus servo direction and in said tracking servo direction, said correction lens holder holding said correction lens and said shaft guiding said correction lens holder in said focus servo direction are provided on a common base.

15. The optical pickup device according to claim 1, wherein said correction lens is a movable lens of a beam expander, wherein said correction lens driving unit drives said movable lens in the same direction as said focus servo direction to thereby correct a wave aberration generated at said objective lens.

16. The optical pickup device according to claim 15, wherein said correction lens is a convex lens of a beam expander, and wherein a concave lens of said beam expander is fixed to a base.

17. The optical pickup device according to claim 16, wherein an objective lens holder holding said objective lens, a magnet for driving said objective lens in said focus servo direction and in said tracking servo direction, said correction lens holder holding said convex lens and said shaft guiding said correction lens holder in said focus servo direction are provided on a common base.

18. The optical pickup device according to claim 15, wherein said correction lens is a concave lens of a beam expander, and wherein a convex lens of said beam expander is fixed to a base.

19. The optical pickup device according to claim 18, wherein an objective lens holder holding said objective lens, a magnet for driving said objective lens in said focus servo direction and in said tracking servo direction, said correction lens holder holding said concave lens and said shaft guiding said correction lens holder in said focus servo direction are provided on a common base.

* * * * *